(No Model.)

L. A. MORESI, Jr.
MACHINE FOR GRANULATING AND DRYING SUGAR.

No. 401,363. Patented Apr. 16, 1889.

WITNESSES:
Percy C. Bowen
Arthur L. Bryant

INVENTOR,
Louis A. Moresi Jr
By Edson Bros,
Attorneys.

UNITED STATES PATENT OFFICE.

LOUIS ANTOINE MORESI, JR., OF JEANERETTE, LOUISIANA.

MACHINE FOR GRANULATING AND DRYING SUGAR.

SPECIFICATION forming part of Letters Patent No. 401,363, dated April 16, 1889.

Application filed November 30, 1888. Serial No. 292,292. (No model.)

*To all whom it may concern:*

Be it known that I, LOUIS ANTOINE MORESI, Jr., a citizen of the United States, and a resident of Jeanerette, in the parish of Iberia and State of Louisiana, have invented certain new and useful Improvements in Machines for Granulating and Drying Sugar; and I do hereby declare the following to be a full, clear, and exact description of the invention, such as will enable others skilled in the art to which it appertains to make and use the same.

My invention relates to machines for sifting, drying, and cooling sugars; and it consists of the novel combination of devices and peculiar construction and arrangement of parts, as will be hereinafter fully described and claimed.

The common method ordinarily practiced of treating sugar after it is discharged from the centrifugal machine is to manually sift and shovel it until sufficiently cool and dry to be packed in barrels and prevent it from solidifying or adhering together in large lumps or masses; but this method is objectionable, as it is slow and tedious, besides being expensive where large quantities of sugar are handled.

My invention has for its object to overcome these objections and to provide a machine to which the sugar is delivered immediately after it leaves the centrifugal machine for automatically sifting, drying, cooling, and granulating the sugar without attention on the part of the attendant.

To enable others to understand my invention, I will now proceed to describe the same in connection with the accompanying drawings, in which—

Figure 1:
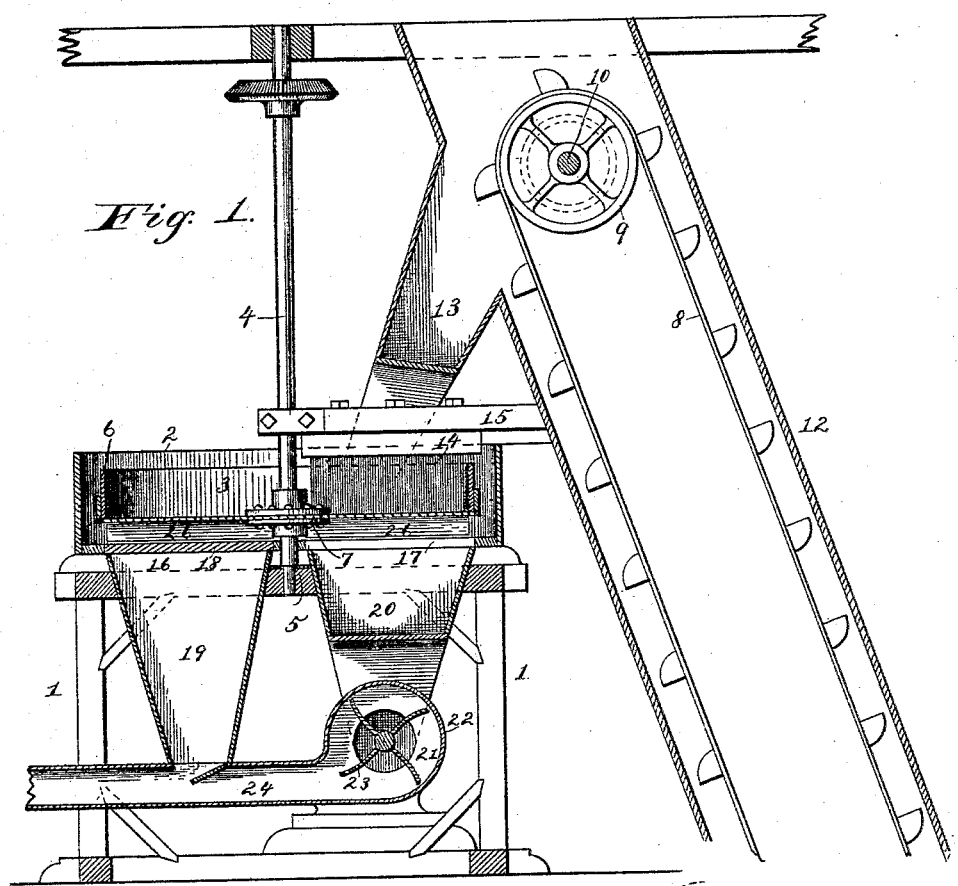
Figure 2:
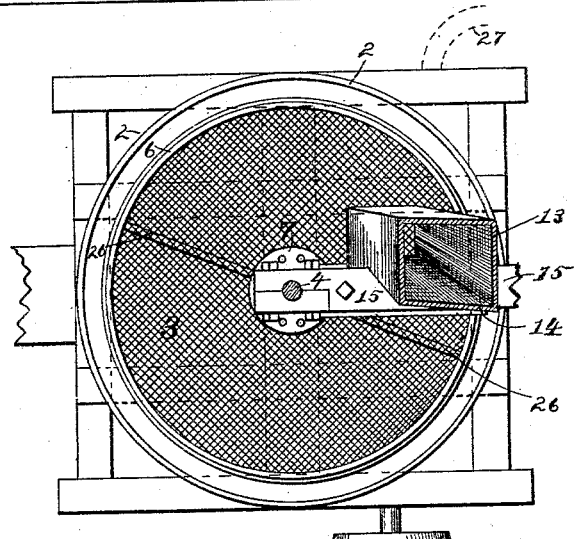

Figure 1 is a vertical sectional view through a sugar-machine embodying my invention, and Fig. 2 is a top plan view thereof.

Referring to the drawings, in which like numerals of reference denote corresponding parts in both figures, 1 designates a stationary frame, on which is secured a horizontal fixed receptacle, 2. Within this receptacle is arranged a horizontal rotary sieve, 3, which is carried by a vertical rotary shaft, 4, that is stepped at its lower end in a suitable bearing, 5, in the frame 1, and provided at its upper end with a bevel gear-wheel or other means adapted to engage with a suitable line of shafting to communicate motion to the vertical shaft 4 and its attached sieve. This sieve 3 is made of stiff strong wires of steel, brass, or other suitable metal, which are intimately woven together to form a mesh of suitable size, and the sieve is provided with a raised rim or flange, 6, to which the mesh is suitably secured. The diameter of the rotary sieve is less than the diameter of the fixed receptacle 2, and the sieve is arranged slightly above the bottom of the receptacle 2 to leave an intervening space and permit the sieve to rotate freely in the receptacle without hinderance therefrom. The sieve is concentrically secured to the rotary shaft 4, preferably by means of a coupling, 7, which consists of two sleeved plates arranged on opposite sides of the sieve and bolted together through the sieve and firmly secured to the shaft.

The sugar to be treated after it leaves the centrifugal machine (not shown) is conveyed to the rotary sieve by an endless elevator, 8, which passes over a suitable pulley, 9, carried by a horizontal driving-shaft, 10, which is provided with a suitable belt-pulley. This elevator 8 is housed within an inclined fixed case, 12, which extends above and over the rotary sieve, and a reversely-inclined discharge-chute, 13, depends from the upper end of this case 12, the pulley 9 and elevator being so arranged with relation to this discharge-chute that the contents of the buckets of the elevator are discharged into the chute after said buckets pass over the pulley, as will be readily understood by reference to Fig. 1. The lower end of this discharge-chute 13 terminates immediately over and out of contact with the rotary sieve 3, so that the sugar is deposited directly thereon.

To cause the wet or damp sugar from the centrifugal machine to properly pass through the rotary sieve and thus assist in granulating the sugar, I have provided a stiff brush, 14, which is held in a stationary position above the sieve, and is arranged in such relation thereto that its bristles sweep the mesh of the sieve and force the sugar through the same. The bristles of this brush are made of steel, brass, or other metal wires, which are suitably secured in a back that is fixed by screws or other suitable fastenings to a horizontal support or bar, 15, arranged above the sieve and receptacle 2, and supported at one end on the shaft 4 and fixed at its other end to the inclined case 12 of the elevator.

The bottom of the receptacle 2 is provided with two discharge-openings, 16 17, and over one of these openings is placed a plate or valve, 18, which is adapted to close either of the openings at will, said valve-plate being removable and made to fit either of the discharge-openings.

In order to prevent the sugar, after it is forced through the sieve, from accumulating in the receptacle 2 beneath the sieve, I have provided two or more sweeps, 26, which are arranged radially beneath and fixed to the sieve so as to sweep over the bottom of the receptacle and force the sugar into one or the other of the discharge-openings.

Two depending chutes, 19 and 20, are secured to the bottom of the receptacle 2 or to the frame 1, and these chutes communicate, respectively, with the discharge-openings 16 17 to conduct the sugar from the sieve and the receptacle 2 into the path of an air blast or current generated by a rotary blower, 21, situated below the receptacle 2 within the frame 1. This rotary blower comprises a suitable case, 22, and a positively-driven fan, 23, of any ordinary well-known pattern, the case having central inlet-ports for the admission of air thereto, and with a reduced neck for the escape of the air blast or current generated by the rotary fan.

A receiving-conduit, 24, is arranged at the discharge end of the rotary blower to receive the blast, and this conduit leads to a bin or other receptacle (not shown) for the reception of the cooled and dried sugar.

One of the depending chutes, 20, communicates with the case of the rotary blower to discharge the sugar from the opening 17 directly on the fan, from whence it is blown through the case into the conduit, while the other chute, 19, opens at its lower end into the conduit at one side of the blower to discharge the sugar from the opening 16 directly into the conduit in the path of the air blast or current.

It is obvious that the valve-plate 18 can be adjusted over either discharge-opening 16 or 17 to close the latter and cause the sugar to escape through one opening and chute, which conducts the sugar either directly to the blower or to the conduit in the path of the blast or current generated by the blower, according to which chute is used.

This being the construction of my machine for sifting, granulating, cooling, and drying sugar, the operation thereof is as follows: The sugar, after it leaves the centrifugal machine, is carried by the endless elevator to the chute 13, which deposits it on the rotary screen, which screen carries a part of the sugar around with it. The stiff metallic brush forces the sugar through the sieve onto the receptacle 2, from whence it is swept into one or the other of the discharge-openings therein by the sweeps fixed to and moving with the rotary sieve. The sugar is conducted by one of the chutes to the rotary blower or to the conduit in line with said blower, where the sugar is subjected to a blast or current of air, which serves to cool and dry the same and make it fit for storage or packing without being liable to accumulate or solidify in lumps, the sugar being blown or forced through the conduit into a suitable receiver. By passing the sugar through the sieve and subjecting it to the action of the brush and the blast or current of air I have found that the sugar is granulated, cooled, and dried, and is thereby improved for the purposes of storage and packing, and by my machine large quantities of sugar can be prepared for packing very economically and expeditiously, as the machine itself performs all the necessary work without attention on the part of the attendant.

I would have it understood that I reserve the right to make such changes in the form and proportion of parts and details of construction of the mechanism herein shown as an embodiment of my invention as fairly fall within the scope thereof.

If desired, warm or hot air may be supplied to the rotary blower for drying the sugar, in which instance a pipe (indicated by dotted lines 27 in Fig. 2) is provided for feeding air centrally to the blower, which pipe leads to a suitable furnace or other heater for heating the air; but it will be understood that when a blast of this character is employed the temperature of the air is not raised to such a degree as to leave any heat in the sugar, but is such as to thoroughly dry and granulate the sugar.

Having thus fully described my invention, what I claim as new, and desire to secure by Letters Patent, is—

1. In a machine for granulating and drying sugar, the combination of a horizontal fixed receptacle having an opening in its bottom, a rotary sieve operating in said receptacle, a fixed brush arranged above and in contact with the sieve, a sweep intermediate the sieve and bottom of the receptacle and fixed to the sieve-carrying shaft, and an air-blower arranged immediately below said receptacle to receive and dry the sugar after it leaves the sieve, substantially as and for the purpose described.

2. In a machine for granulating and drying sugar, the combination of a receptacle having an opening in its bottom, a rotary sieve, an air-blower below said receptacle, a conduit communicating with the blower, and a chute intermediate the receptacle and conduit for discharging the sugar in the conduit in the path of the blast or current generated by the blower, substantially as described.

3. In a machine for granulating and drying sugar, the combination of a receptacle having an opening in its bottom, a rotary sieve operating in said receptacle, a stationary brush arranged in contact with the sieve, a sweep fixed to and rotating with the sieve to force the sugar between the sieve and bottom of the receptacle into the opening in the latter, an air-blower beneath the receptacle, a conduit communicating with said blower, and a chute intermediate the receptacle and conduit, substantially as described.

4. In a machine for granulating and drying sugar, the combination of the following elements, to wit: a stationary receptacle having the openings in its bottom and a valve-plate for closing one of said openings, a rotary sieve carried by a shaft, the stiff brush fixed above the sieve, an elevator having an inclined discharge-chute terminating immediately above the sieve, a rotary blower, a conduit communicating with said blower, and the chutes depending from the receptacle, one of said chutes communicating with the blower-shell and the other with the conduit, all arranged and adapted for service substantially as described.

In testimony whereof I affix my signature in presence of two witnesses.

LOUIS ANTOINE MORESI, Jr.

Witnesses:
D. J. WEBSTER,
A. F. PETIT, Fils.